Figure 1:
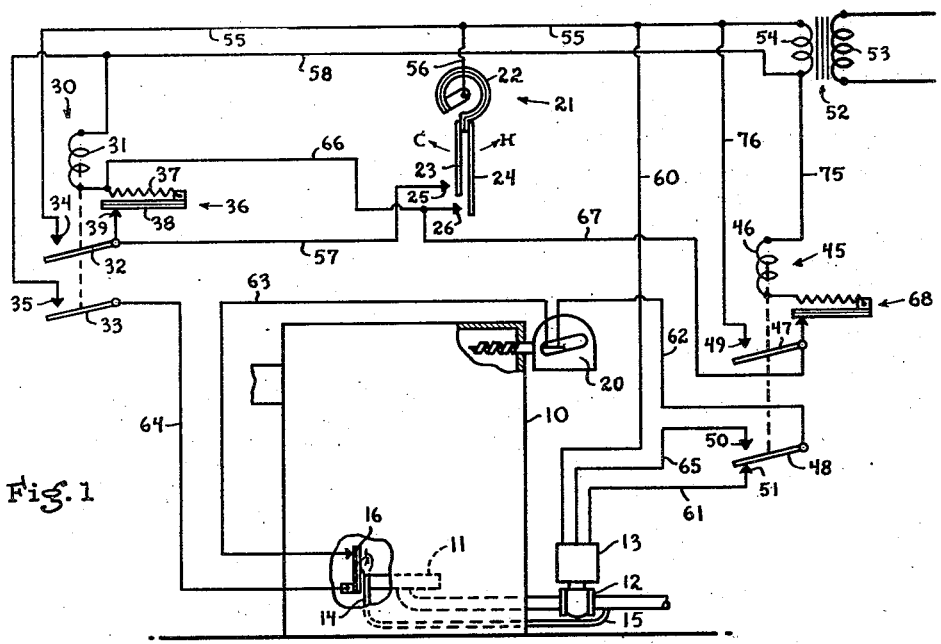

Sept. 14, 1943.  W. L. McGRATH  2,329,636
CONTROL SYSTEM
Filed Jan. 18, 1941  2 Sheets-Sheet 1

INVENTOR
William L. McGrath
BY George H. Fisher
ATTORNEY

Sept. 14, 1943.   W. L. McGRATH   2,329,636
CONTROL SYSTEM
Filed Jan. 18, 1941   2 Sheets-Sheet 2

INVENTOR
William L. McGrath
BY
George H. Fisher
ATTORNEY

Patented Sept. 14, 1943

2,329,636

UNITED STATES PATENT OFFICE 2,329,636

CONTROL SYSTEM

William L. McGrath, Philadelphia, Pa., assignor to Minneapolis-Honeywell Regulator Company, Minneapolis, Minn., a corporation of Delaware Application January 18, 1941, Serial No. 375,009

18 Claims. (Cl. 236—68)

This invention relates to systems for controlling the magnitude of a condition generally, and more particularly to thermostatically operated systems for controlling the temperature of a building.

Most common types of temperature control systems include a thermostat in the space whose temperature is to be controlled, and a heater controlled by the thermostat. In such systems, the thermostat is usually set to turn on the heater when the temperature of the space being heated drops below a certain level, and to turn the heater off when the temperature exceeds a different, slightly higher level. There is nearly always a delay between a call for heat by the thermostat and the supplying of heat to the space, with the result that the space temperature continues to drop below the desired value. Similarly, when the space temperature has been restored and the thermostat calls for a shut-down of the heating system, usually some heat remains in the heating means which has not been dissipated into the space, and the dissipation of this remaining heat usually results in raising the space temperature above the desired value. Conditions such as these are known as "over-shooting" or "hunting," and their elimination has been greatly sought after in designing control systems.

An object of this invention is to provide a control system having improved means for preventing the occurrence of "over-shooting."

Another object of the present invention is to control heating means adapted to operate at different stages of heat output in such a manner as to substantially prevent "over-shooting."

A further object of the invention is to provide a control system in which a two-stage heater is operated either intermittently at its low stage, or alternately at its low and high stages.

A further object of the invention is to provide a control system in which a two-stage heater is operated either intermittently at its low stage, alternately at its high and low stages, or continuously at its high stage.

A further object of the invention is to provide a control system for a heater operable at a plurality of stages, whereby the average heater output may be selectively set at one of a number of levels greater than the number of heater stages. For example, a heater may be operable at either low or high output stages. Continuous operation at these two stages produces two different average output levels, while alternate operation at the two levels will produce a third average output level intermediate of the other two.

A further object of the invention is to provide a control system in which a condition changing means may be controlled by closure of a single set of contacts operated by condition responsive means but in which improved means are provided for preventing intermittent operation of the condition changing means due to chattering of the contacts.

A further object is to provide a temperature control system of the type described in which the condition responsive means is an on-and-off thermostat, i. e., one which closes its contacts when operating in one direction only.

Figure 2:
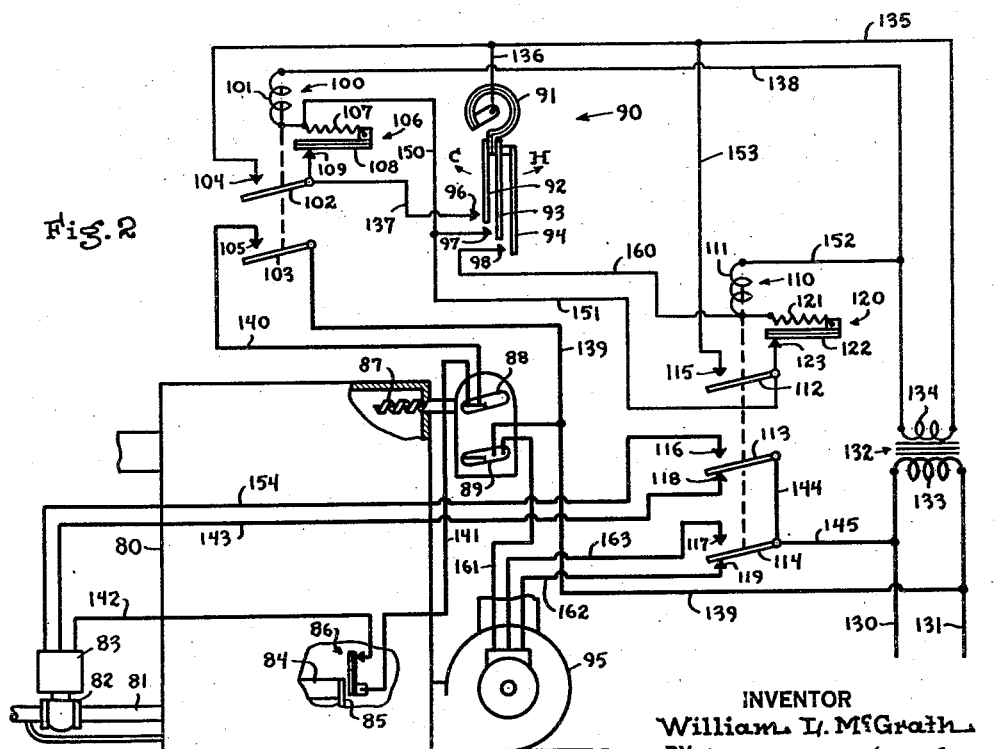
Figure 3:
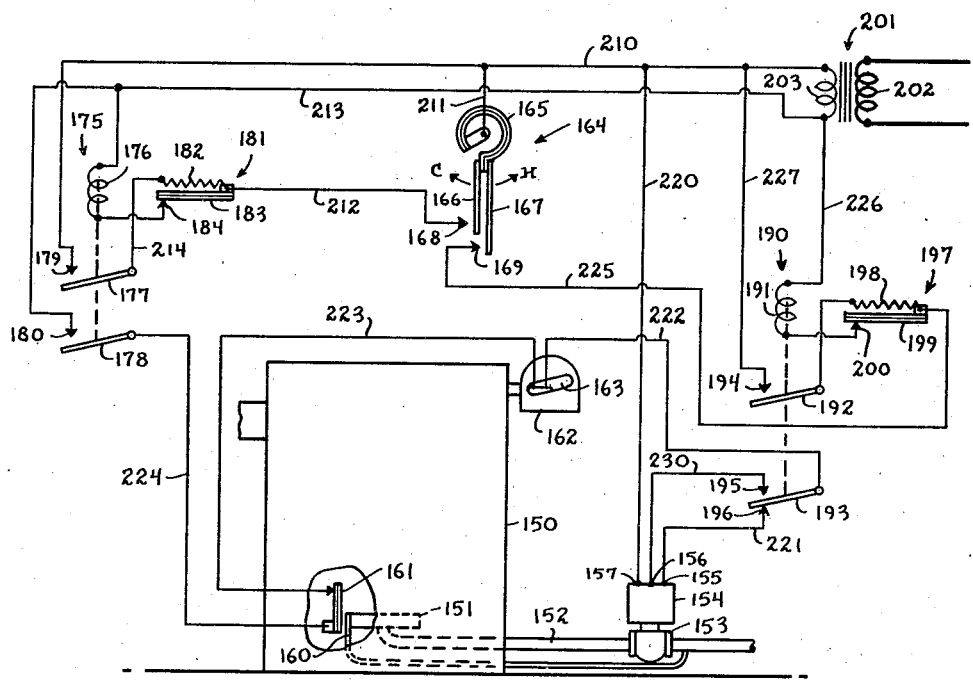

Other objects and advantages of the invention will become apparent from an inspection of the following specification together with the accompanying drawing, in which Figure 1 is a diagrammatic showing of a heating system operated in accordance with my invention, Figure 2 is a diagrammatic showing of a modification of the system of Figure 1, and Figure 3 is a diagrammatic showing of another modification of my invention.

Figure 1 shows a furnace 10 of the hot air type. The furnace is shown as supplied with gaseous fuel although it will be readily understood that other types of furnaces could be regulated according to the control system of the present invention. A main burner 11 in the furnace 10 is supplied with gas through a valve 12. An operating mechanism 13 is provided for the valve 12 and is of a type which operates the valve to three different positions, for example, closed, partly open and full open. A pilot burner 14 is supplied with gas through a pipe 15 which by-passes the valve 12. A safety switch 16 is mounted adjacent the pilot burner 14 in order that the system may be shut down upon failure of the pilot flame. A thermostatically operated limit switch 20 is mounted in the bonnet of the furnace 10 and operates to shut down the system in case the air temperature within the bonnet rises to an unsafe value.

The furnace 10 is controlled by a thermostat generally indicated at 21 and consisting of a bimetallic element 22 operating a pair of switch arms 23 and 24. As indicated by the legend in the drawings the thermostat 21 moves the switch arms 23 and 24 to the left upon a drop in temperature, thereby sequentially engaging them with stationary contacts 25 and 26.

A relay 30 is provided comprising a winding 31 operating switch arms 32 and 33. When the winding 31 is energized the switch arms 32 and 33 are engaged with stationary contacts 34 and 35, respectively. A thermal switch 36 is provided for intermittently opening the energizing circuit of the relay 30 for a purpose to be described later. The switch 36 comprises a heater coil 37 and a bimetallic switch arm 38 cooperating with a stationary contact 39. The thermal switch 36 may conveniently be placed near the relay 30, which is usually located in the basement, or some other place remote from the thermostat, where plenty of space is available.

Another relay 45 is provided in the control system which comprises a winding 46 operating switch arms 47 and 48. These switch arms are engaged respectively with contacts 49 and 50 when the winding 46 is energized. When the winding is deenergized switch arm 48 engages another stationary contact 51.

Power is supplied to the system through a transformer 52 having a primary winding 53 and a secondary winding 54.

*Operation of Figure 1 species*

When the parts are in the position shown in the drawings the thermostat 21 is satisfied and the furnace 10 is not in operation. The furnace is in normal operation condition. That is, the pilot burner is lit so that the safety switch 16 is closed, and the bonnet temperature is normal so that the limit switch 20 is closed. Upon a drop in temperature adjacent the thermostat 21 the switch arm 23 will be closed against the contact 25 thereby completing an energizing circuit for the relay winding 31. This circuit may be traced from the upper terminal of secondary winding 54 through conductors 55 and 56, bimetallic element 22, switch arm 23, contact 25, a conductor 57, contact 39, switch 36, relay winding 31, and a conductor 58 to the lower end of secondary winding 54. Energization of the relay winding 31 will cause the closure of switch arm 32 against contact 34, thereby completing a holding circuit for the relay which is independent of the thermostat 21. This circuit may be traced from the upper terminal of secondary winding 54 through conductor 55, contact 34, switch arm 32, switch 36, winding 31 and conductor 58 back to the lower terminal of secondary 54.

Energization of relay 31 will also cause the closure of switch arm 33 against contact 35, thereby completing an energizing circuit for the valve operating mechanism 13 which will cause the valve 12 to move to its intermediate position. This circuit may be traced from the upper terminal of secondary winding 54 through the conductor 55, a conductor 60, valve operating mechanism 13, a conductor 61, contact 51, switch arm 48, a conductor 62, limit switch 20, a conductor 63, safety switch 16, a conductor 64, switch arm 33, contact 35, and conductor 58 back to the lower terminal of secondary winding 54.

The valve operating mechanism 13 is constructed so that the valve is normally closed when the mechanism is not energized. When an energizing circuit is completed through the conductor 61 and switch contact 51 the valve is moved to its intermediate position and when a circuit is completed through contact 50 and a conductor 65 the valve is moved to its full open position.

After the last described circuit has been established the furnace 10 will continue to operate at its lower stage of output, providing the thermostat 21 does not change its position. This operation at the low stage of output, however, will be rendered intermittent by the action of the switch 36. As soon as the winding 37 has heated up due to the flow of current therethrough the bimetallic element 38 will be warped away from the contact 39 thus opening the energizing circuit of the relay winding 31. The energizing circuit for the valve operating mechanism 13 will consequently be opened at the contact 35 and the operation of the furnace will stop until the bimetallic switch arm 38 has cooled sufficiently to reengage the contact 39 at which time the above described heating cycle will be repeated.

If, while the intermittent operation of the heater at its lower stage of output is going on, the thermostat 21 should experience a further fall in temperature, the switch arm 24 would be moved to engage the contact 26. This would close a circuit shunting the switch 36 from the energizing circuit of the relay coil 31. This circuit may be traced from the upper end of secondary winding 54 through conductors 55 and 56, bimetallic element 22, switch arm 24, contact 26, a conductor 66, relay winding 31, and conductor 58 back to the lower terminal of secondary winding 54.

Closure of switch arm 24 against contact 26 would also complete an energizing circuit for relay winding 46. This circuit may be traced from the upper end of secondary winding 54 through conductors 55 and 56, bimetallic element 22, switch arm 24, contact 26, a conductor 67, a thermal switch 68, relay winding 46, and a conductor 75 to the lower end of secondary winding 54.

Energization of the winding 46 would cause closure of the switch arm 47 against contact 49 thereby completing a holding circuit for the winding 46 which is independent of the thermostat 21. This circuit may be traced from the upper end of secondary winding 54 through conductors 55 and 76, contact 49, switch arm 47, thermal switch 68, relay winding 46 and conductor 75 to the lower end of secondary winding 54.

Energization of relay winding 46 would also cause the switch arm 48 to close against the contact 50 thereby shifting the energizing circuit of the valve operating mechanism 13 to the conductor 65 and causing the valve to change from intermediate position to full open position. This causes the furnace 10 to operate at its maximum output. Assuming that the thermostat 21 does not change its position this operation will continue until the thermal switch 68 opens, deenergizing the relay 45. This action will allow the furnace to go back to its lower stage of output.

It will be seen therefore that the furnace 10 is operated intermittently at its low output stage when the switch arm 23 engages the contact 25 and that when the switch arm 24 engages contact 26 the furnace is operated alternately at its low and high output stages.

This mode of operation provides a much smoother flow of heat to the space being controlled than is obtained by the use of the prior art devices. The intermittent operation of the heater prevents the building up of an excessive reserve of heat in the system to be dissipated after the thermostat becomes satisfied. The use of a two-stage heater permits a graduated response of the heater to the two-position thermostat, while retaining the advantages of intermittent operation for both positions of the thermostat.

*Figure 2*

In Figure 2 I have shown a different embodiment of my invention in which a different type of thermostat is used and in which the furnace may be controlled so as to operate continuously at its maximum output stage. The device of Figure 2 is also shown to have its main operating circuit energized at line voltage and has a two speed blower operated in connection with the furnace. It will be readily understood by those skilled in the art that these last two modifications are merely illustrative of alternative forms of construction which may be used with either embodiment of my invention.

A furnace 80 has a main burner 84 supplied with fuel through a pipe 81 controlled by a valve 82 having an operating mechanism 83. A pilot burner 85 is provided and a safety switch 86 is mounted adjacent thereto. A thermostat 87 is mounted in the bonnet of a furnace and operates a limit switch 88 and a fan switch 89. The furnace 80 is of the warm air type and is provided with a blower 95 for circulation of the heated air. The blower 95 is of such construction that it may be operated at either of two different speeds.

Operation of the furnace 80 is controlled by a thermostat generally indicated at 90 having a bimetallic element 91, operating switch arms 92, 93 and 94. As indicated by the legend in the drawings, the thermostat 90 moves the switch arms 92, 93 and 94 to the left upon a drop in temperature, thereby sequentially engaging them with stationary contacts 96, 97 and 98.

A relay 100 is used in the present embodiment of my invention and comprises a winding 101 operating switch arms 102 and 103. When the winding 101 is energized the switch arms 102 and 103 are closed against contacts 104 and 105, respectively. A thermal switch 106 is provided to intermittently open the energizing circuit of the relay winding 101. This switch 106 comprises a heater coil 107 and a bimetallic switch arm 108 cooperating with a contact 109.

Another relay 110 is used in this control system having a winding 111 operating switch arms 112, 113 and 114. When the winding 111 is energized the switch arms 112, 113 and 114 are engaged with contacts 115, 116 and 117, respectively. When the winding 111 is deenergized switch arms 113 and 114 engage contacts 118 and 119, respectively. A thermal switch 120 is provided to intermittently open the energizing circuit of the relay winding 111. This thermal switch 120 comprises a heater coil 121 and a bimetallic switch arm 122 cooperating with a contact 123.

This system is supplied with energy from lines 130 and 131. A transformer 132 is provided to convert the line voltage to the low voltage necessary for the operation of the relays. This transformer 132 has a primary winding 133 and a secondary winding 134.

*Operation of the species of Figure 2*

When the parts are in the position shown in the drawings, the thermostat 90 is satisfied and the furnace is not in operation. If the temperature adjacent the thermostat 90 drops the switch arm 92 will be moved into engagement with a stationary contact 96, thus completing an energizing circuit for the relay winding 101. This circuit may be traced from the right hand end of secondary winding 134 through conductors 135 and 136, bimetallic element 91, switch arm 92, contact 96, a conductor 137, thermal switch 106, relay winding 101, and conductor 138 to the left hand end of secondary winding 134.

Energization of the relay winding 101 results in the closure of a holding circuit for the relay through the contact 104 and switch arm 102. This circuit may be traced from the right hand end of secondary winding 134 through conductor 135, contact 104, switch arm 102, thermal switch 106, relay winding 101 and conductor 138 to the left hand end of secondary winding 134.

Energization of relay winding 101 also closes the switch arm 103 on contact 105 thereby completing an energizing circuit for the valve operating mechanism 83. This circuit may be traced from supply line 131 through conductor 139, switch arm 103, contact 105, a conductor 140, limit switch 88, a conductor 141, safety switch 86, a conductor 142, valve operating mechanism 83, a conductor 143, contact 118, switch arm 113, and conductors 144 and 145 to supply line 130. This energizes the operating mechanism 83 so that the valve 82 is moved to an intermediate position and the furnace 80 is operated at its lower output stage. As long as no further movement of the thermostat 90 takes place this operation continues intermittently under the control of the thermal switch 106.

If the temperature adjacent the thermostat 90 continues to drop, the switch arm 93 engages the stationary contact 97; this completes an energizing circuit for the relay winding 101 which shunts the thermal switch 106. This circuit may be traced from the right hand end of secondary winding 134 through conductors 135 and 136, bimetallic element 91, switch arm 93, contact 97, a conductor 150, relay winding 101, and conductor 138 to the left hand end of secondary winding 134.

Closure of the switch arm 93 against contact 97 also completes an energizing circuit for the relay winding 111. This circuit may be traced from the right hand end of secondary winding 134 through conductors 135 and 136, bimetallic element 91, switch arm 93, contact 97, a conductor 151, thermal switch 120, relay winding 111, a conductor 152, and conductor 138 to the left hand end of relay winding 134.

Energization of relay winding 111 causes the switch arm 112 to close against the contact 115 thereby completing a holding circuit for the relay 111 which is independent of the thermostat 90. This circuit may be traced from the right hand end of secondary winding 134 through conductors 135 and 153, contact 115, switch arm 112, thermal switch 120, relay winding 111, and conductors 152 and 138 to the left hand end of secondary winding 134.

Energization of relay winding 111 also causes the switch arm 113 to move out of engagement with the contact 118 and close against the contact 116. This causes the energizing circuit for the valve operating mechanism 83 to be completed through a conductor 154 instead of through conductor 143 and thereby causes the valve operating mechanism to move the valve to its full open position.

If the thermostat 90 maintains this position, the furnace 80 will be operated alternately at its high and low output levels under control of the thermal switch 120.

If the temperature adjacent the thermostat 90 drops still further, the switch arm 94 will be moved into engagement with the contact 98. This completes an energizing circuit for the relay winding 111 which shunts the thermal switch 120 and thereby maintains the heater 80 at its high output level. This circuit may be traced from the right hand end of secondary winding 134 through conductors 135 and 136, bimetallic element 91, switch arm 94, contact 98, conductor 160, relay winding 111 and conductors 152 and 138 to the left hand end of secondary winding 134.

When the temperature in the furnace bonnet rises a sufficient amount that the air therein may be efficiently used for heating the house, the fan switch 89 will be closed by the thermostatic element 87, thus completing an energizing circuit for the fan 95. This circuit may be traced from supply line 131 through conductor 139, fan switch 89, a conductor 161, fan 95, a conductor 162, contact 119, switch arm 114, and conductor 145 to supply line 130. The last described circuit causes operation of the fan at its lower speed. When the furnace is operating at its high output stage, the switch arm 114 is moved against contact 117 and the fan energizing circuit then passes through a conductor 163. The internal connections of the fan 95 are such that the fan is operated at its high speed when energized through the conductor 163 and at its low speed when energized through conductor 162.

It will be seen that in this embodiment of my invention, the furnace 80 is operated at its low output stage when the switch arm 92 engages contact 96, alternately at its low and high output stages when switch arm 93 engages contact 97, and continuously at its high output stage when switch arm 94 engages contact 98. It will be further apparent that the fan 95 will be operated whenever the bonnet temperature is high enough that the air therein will efficiently heat the house. The speed at which the fan is driven will depend upon the output stage at which the furnace is operating.

Figure 3

In Figure 3 is shown another embodiment of my invention in which the two-stage furnace may be operated continuously at either of its two stages and in which the only function of the timer is to prevent intermittent operation of the furnace because of chattering of the thermostat contact.

A furnace 150 has a main burner 151 supplied with fuel through a pipe 152 controlled by a valve 153 having an operating mechanism 154. The operating mechanism 154 is preferably of an electrically operated type and has three terminals 155, 156 and 157. The construction is preferably such that when the mechanism 154 is energized through the terminals 155 and 157, the valve is moved to its intermediate position and when the mechanism is energized through the terminals 156 and 157 the valve is moved to its full open position. When the operating mechanism 154 is deenergized the valve is closed by a spring or other internal biasing means.

A pilot burner 160 is provided to ignite the gas flowing from the main burner and a safety switch 161 is provided adjacent to the pilot burner. A thermostat 162 is mounted in the bonnet of the furnace and operates a limit switch 163.

The furnace 150 is controlled by a thermostat generally indicated at 164 and consisting of a bimetallic element 165 operating a pair of switch arms 166 and 167. The switch arms 166 and 167 cooperate with a pair of stationary contacts 168 and 169 respectively. As indicated by the legend in the drawings, the thermostat 164 moves the switch arms 166 and 167 to the left upon a drop in temperature thereby sequentially engaging them with the stationary contacts 168 and 169.

A relay 175 is provided for controlling the operation of the furnace and includes a winding 176 and switch arms 177 and 178 cooperating with contacts 179 and 180, respectively. A thermal switch 181 cooperates with the relay 175 and comprises a heater winding 182, a bimetallic element 183 and a contact 184. The construction of switch 181 is such that when heater 182 is energized, the heat supplied to bimetallic element 183 causes it to warp away from contact 184.

A second relay generally indicated at 190 is provided for controlling the shift of the burner 150 from low to high stage operation and vice versa. The relay 190 consists of a winding 191 operating switch arms 192 and 193. The switch arms 192 and 193 engage stationary contacts 194 and 195 when the relay is energized. When the relay is deenergized, the switch arm 193 engages a contact 196. A thermal switch 197, similar to switch 181, cooperates with the relay 190 and consists of a heater winding 198, a bimetallic element 199 and a contact 200.

The system is supplied with energy through a transformer 201 having a primary winding 202 and a secondary winding 203.

Operation of species of Figure 3

When the parts are in the position shown in the drawings, the thermostat 164 is satisfied and the furnace 150 is not in operation. If the temperature adjacent the thermostat 164 now begins to decrease, the switch arm 166 is moved to the left against the contact 168. This completes an energizing circuit for the relay winding 176 which may be traced from the upper terminal of transformer secondary 203 through a conductor 210, a conductor 211, bimetallic element 165, switch arm 166, contact 168, a conductor 212, bimetallic element 183, contact 184, winding 176 and a conductor 213 to the lower terminal of secondary winding 203.

Energization of the relay winding 176 causes the switch arm 177 to close against the contact 179. This completes a holding circuit for the relay 175 which may be traced from the upper terminal of secondary winding 203 through conductor 210, contact 179, switch arm 177, conductor 214, heater element 182, bimetallic element 183, contact 184, winding 176 and conductor 213 to the lower terminal of secondary winding 203. It should be noted that the heater 182 is shunted by the engagement of the switch arm 166 with the contact 168 so that the bimetallic element 183 is not warped so as to disengage from contact 184 as long as switch arm 166 remains in engagement with contact 168.

Energization of relay 175 also causes the closure of switch arm 178 against contact 180 thereby completing an energizing circuit for the valve operating mechanism 154. This circuit may be traced from the upper terminal of secondary winding 203 through conductor 210, a conductor 220, terminal 157, operating mechanism 154, terminal 155, a conductor 221, contact 196, switch arm 193, a conductor 222, switch 163, a conductor 223, safety switch 161, a conductor 224, switch arm 178, contact 180, and conductor 213 to the lower end of secondary winding 203. Assuming that the furnace 150 is in a safe operating condition, and that the safety switch 161 and the limit switch 163 are both therefore closed, this energizing circuit results in the opening of the valve 153 to its intermediate position and the operation of the furnace 150 at its low stage.

If the temperature adjacent to thermostat 164 continues to fall, the switch arm 167 is moved into engagement with the contact 169. This completes an energizing circuit for the relay winding 191. This circuit may be traced from the upper terminal of secondary winding 203 through conductors 210 and 211, bimetallic element 165, switch arm 167, contact 169, a conductor 225, bimetallic element 199, contact 200, winding 191 and a conductor 226 to the lower terminal of secondary winding 203.

Energization of the winding 191 results in the moving of switch arm 192 into engagement with contact 194, thereby completing a holding circuit for the winding 191. This holding circuit may be traced from the upper terminal of secondary winding 203 through conductor 210, a conductor 227, contact 194, switch arm 192, heater element 198, bimetallic element 199, contact 200, winding 191 and conductor 226 to the lower terminal of secondary winding 203. As previously noted in the case of thermal switch 181, the heater element 198 is shunted by the engagement of switch arm 167 with contact 169 and is therefore not energized to cause warping of the bimetallic element 199 away from contact 200 as long as that switch arm remains in engagement with the contact 169.

Energization of the winding 191 also causes switch arm 193 to move out of engagement with the contact 196 and into engagement with the contact 195. This causes the valve operating mechanism 154 to be energized through a new circuit which may be traced from the upper terminal of secondary winding 203 through conductors 210 and 220, terminal 157, operating mechanism 154, terminal 156, a conductor 230, contact 195, switch arm 193, a conductor 222, switch 163, conductor 223, switch 161, conductor 224, switch arm 178, contact 180 and conductor 213 to the lower terminal of secondary winding 203. As previously indicated, energization of the mechanism 154 through contact terminals 156 and 157 causes movement of the valve 153 to its full open position and hence operation of the furnace 150 at its high stage of output.

Now assume that the temperature adjacent the thermostat 164 begins to increase, the switch arm 167 is moved to the right and disengages from the contact 169. This opens the energizing circuit of the relay winding 191. The relay winding 191 is then energized through its holding circuit previously described, including the heater element 198. Energization of the heater 198 results after a predetermined time in the warping of bimetallic element 199 away from contact 200 thereby opening the holding circuit. The winding 191 is then deenergized and the switch arm 192 moves away from contact 194 and the switch arm 193 moves out of engagement with contact 195 and into engagement with contact 196. This opens the circuit which causes the operating mechanism 154 to hold the valve 153 in its full open position and again closes the circuit which causes valve 153 to be held in its intermediate position. The burner 150 therefore returns to its low stage operating condition.

If the temperature continues to decrease, the switch arm 166 moves out of engagement with the contact 168, thus opening the energizing circuit for relay winding 176. The relay winding 176 is then energized through the holding circuit including the heater 182 previously described. After this circuit including the heater 182 has been energized for a predetermined period of time, the bimetallic element 183 will be warped away from engagement with the contact 184. This opens the holding circuit for the relay winding 176 and allows switch arms 177 and 178 to move out of engagement with contacts 179 and 180 respectively.

Movement of switch arm 178 out of engagement with contact 180 opens the energizing circuit to the operating mechanism 154 and allows the valve 153 to return to closed position thereby shutting down the furnace 150.

It will be seen that fluctuation of the temperature adjacent the thermostat 94 at or near the temperature values which cause engagement of either of the switch arms 166 or 167 with its associated contact does not cause intermittent energization of the relay 176. When the switch arm 166 first closes against the contact 168, it completes an energizing circuit for the relay 176. As soon as the latter picks up its armature it completes a holding circuit for itself through the heater 182. Therefore any fluctuations in the temperature adjacent the thermostat 164 which might cause the switch arm 166 to vibrate or chatter against its contact 168, would not cause intermittent energization of the relay 176 but would merely produce intermittent energization of the heater 182. The heater 182 is designed so that it must remain energized for a predetermined time before the bimetallic element 183 is heated sufficiently to separate from the contact 184. Therefore, this intermittent energization of the heater 182 is not sufficient to open the holding circuit of the relay 176. The furnace 150 therefore continues to operate at its low stage of operation until a change in the temperature adjacent the thermostat 164 occurs which is sufficient to move the switch 166 definitely to the right and out of engagement with the contact 168 for a time long enough to permit heater 182 to warp the bimetallic element 183 away from the contact 184.

The operation of the relay 191 at such times as the switch arm 167 chatters against the contact 169 is exactly similar to that described in connection with the relay 175. It may therefore be seen that chattering of either thermostat contact will not cause intermittent operation of the furnace.

While I have shown and described preferred embodiments of my invention, it should be understood that it is to be limited only by the definitions set forth in the appended claims.

I claim as my invention:

1. A condition control system comprising in combination, condition changing means operable at two different stages of activity, means movable in accordance with the value of a condition indicative of the need for operation of said condition changing means, electrical circuits for controlling the stage of activity of said condition changing means, means for intermittently opening said circuits, and connections between said movable means and said circuits, said movable means, said circuits, said opening means and said connections cooperating to prevent operation of said condition changing means when said movable means is in a first range of positions, to cause operation of said condition changing means intermittently at one stage when said movable means is in a second range of positions, and alternately at its two stages when said movable means is in a third range of positions.

2. A condition control system comprising in combination, condition changing means operable at two different stages of activity, means movable in accordance with the value of a condition indicative of the need for operation of said condition changing means, electrical circuits for controlling the level of activity of said condition changing means, means for intermittently opening said circuits, and connections between said movable means and said circuits, said movable means, said opening means and said connections cooperating to prevent operation of said condition changing means when said movable means is in a first range of positions, to cause operation of said condition changing means intermittently at one stage when said movable means is in a second range of positions, alternately at its two stages when said movable means is in a third range of positions, and continuously at its other stage when said movable means is in a fourth range of positions.

3. A temperature control system comprising in combination, temperature changing means operable at two different output stages, thermostatic means movable in response to a condition indicative of the need for operation of said temperature changing means, a pair of switches closable in sequence by said thermostatic means, electrical circuits controlled by said switches for determining the output stage of said temperature changing means, means for periodically interrupting said circuits, said circuits and said interrupting means causing operation of said temperature changing means intermittently at the lower of said two output stages when one of said switches is closed, and alternately at said two output stages when both of said switches are closed.

4. A temperature control system comprising in combination, temperature changing means operable at two different output stages, thermostatic means movable in response to a condition indicative of the need for operation of said temperature changing means, three switches closable in sequence by said thermostatic means, electrical circuits controlled by said switches for determining the output stage of said temperature changing means, means for periodically interrupting certain of said circuits, said circuits and said interrupting means causing operation of said temperature changing means intermittently at the lower of said two output stages when one of said switches is closed, alternately at said two stages when two switches are closed, and continuously at the higher of said stages when all three switches are closed.

5. In a condition control system, in combination, condition changing means, a pair of relays for controlling operation of said condition changing means, a device responsive to a condition indicative of the need for operation of said condition changing means, first, second and third switches closable in sequence by said device, first electrical circuit means for energizing one of said relays intermittently when said first switch is closed, second circuit means for energizing said one relay continuously when said second switch is closed, third circuit means for energizing the other of said relays intermittently when said second switch is closed, and fourth circuit means for energizing said other relay continuously when said third switch is closed.

6. In a condition control system, in combination, condition changing means, a pair of relays for controlling operation of said condition changing means, a device responsive to a condition indicative of the need for operation of said condition changing means, first and second switches closable in sequence by said device, first electrical circuit means for energizing one of said relays intermittently when said first switch is closed, second electrical circuit means for energizing said one relay continuously when said second switch is closed, and third electrical circuit means for energizing the other of said relays intermittently when said second switch is closed.

7. In a condition control system, in combination, condition changing means, a plurality of relays for controlling operation of said condition changing means, a device responsive to a condition indicative of the need for operation of said condition changing means, a plurality of switches operable in sequence by said device, the number of said switches being greater by one than the number of said relays, and a pair of energizing circuits for each of said relays, one of said circuits for each relay being controlled by one of said switches and including means to deenergize said relay intermittently, the other of said circuits for each relay being controlled by the switch following said one switch in sequence, and serving to energize said relay continuously.

8. A temperature control system comprising in combination, temperature changing means operable at two different output stages, thermostatic means movable in response to a condition indicative of the need for operation of said temperature changing means, a pair of switches closable in sequence by said thermostatic means, a pair of relays, an energizing circuit for each relay controlled by one of said switches, a holding circuit for each relay, switches for controlling said holding circuits, means for opening each said holding circuit switch a predetermined time after opening of the corresponding thermostatically operated switch, and means controlled by said relays for determining the output stage of said temperature changing means.

9. A temperature control system comprising in combination, temperature changing means operable at two different output stages, thermostatic means movable in response to a condition indicative of the need for operation of said temperature changing means, a pair of switches closable in sequence by said thermostatic means, a pair of relays, a holding switch controlled by each of said relays, an energizing circuit for each relay including one of said thermostatically controlled switches, a holding circuit for each relay including its related holding switch, current-responsive means in each holding circuit shunted by closure of the associated thermostatically controlled switch, each said current-responsive means being effective to open the circuit through it a predetermined time after opening of the associated thermostatically controlled switch, and means controlled by said relays for determining the output stage of said temperature changing means.

10. In a condition control system, in combination, condition changing means, first switch means, a relay for controlling operation of said condition changing means and for operating said first switch means, second switch means, a device responsive to a condition indicative of the need for operation of said condition changing means for operating said second switch means, said second switch means comprising a pair of switches closable in sequence by said device, third switch means, time-controlled means for intermittently operating said third switch means, a first energizing circuit for said relay winding including in parallel said first switch means and the first to close of said pair of switches and including said third switch means in series, and a second energizing circuit for said relay winding including the second to close of said pair of switches and a connection shunting all the switches in said first circuit.

11. In a condition control system, in combination, condition changing means, first switch means, a relay for controlling operation of said condition changing means and for operating said first switch means, second switch means, a device responsive to a condition indicative of the need for operation of said condition changing means for operating said second switch means, third switch means, current responsive means for intermittently operating said third switch means, an energizing circuit for said relay including said second switch means and said third switch means in series, and a holding circuit for said relay including said first switch means and said current responsive means in a connection shunting said second switch means.

12. A temperature control system comprising in combination, temperature changing means, thermostatic means movable in response to a condition indicative of the need for operation of said temperature changing means, a switch operable by said thermostatic means upon movement thereof, a relay for controlling said temperature changing means, a holding switch operated by said relay, a normally closed heat responsive switch, electrical heater means for opening said switch, an energizing circuit for said relay including said thermostatically operated switch, and a holding circuit for maintaining said relay energized for a predetermined time after opening of said energizing circuit, said holding circuit including said holding switch, said electrical heater means, and said heat responsive switch, said thermostatically operated switch serving to shunt said heater means so as to maintain said relay continuously energized while said thermostatically operated switch is closed and to delay the operation of said heater means during a period when the thermostatically operated switch is chattering.

13. A condition control system, comprising in combination, condition changing means, a switch operable in response to a condition indicative of the need for operation of said condition changing means, a relay for controlling said condition changing means, a holding switch operated by said relay, a normally closed switch, current responsive timer means for opening said normally closed switch, an energizing circuit for said relay including said condition responsive switch, and a holding circuit for maintaining said relay energized for a predetermined time after opening of said energizing circuit, said holding circuit including said holding switch, said current responsive timer means and said normally closed switch, said condition responsive switch being connected so as to shunt said current responsive timer means, thereby maintaining said relay continuously energized while said condition responsive switch is closed and delaying operation of said timer means during a period when said condition responsive switch is chattering.

14. A condition control system comprising in combination, condition changing means operable at a plurality of different output stages, means movable in response to a condition indicative of the need for operation of said condition changing means, a plurality of switches closable in sequence by said condition responsive means, at least one electrical circuit controlled by each of said switches for determining the output stage of said condition changing means, said plurality of circuits including two circuits controlled by two of said sequentially closed switches and effective to cause operation of said condition changing means at the same output stage, and means for periodically interrupting one of said two circuits.

15. Electrical control apparatus, comprising in combination, a pair of load circuit means to be controlled, a first relay for controlling one of said load circuit means, a second relay for controlling the other of said load circuit means, first control circuit means for energizing said first relay, first current responsive circuit-interrupting means connected in said first control circuit means, second control circuit means for energizing said first relay independently of said circuit-interrupting means, at least one control circuit means for energizing said second relay, and second current responsive circuit-interrupting means connected in said one control circuit means for said second relay.

16. Electrical control apparatus, comprising in combination, a pair of load circuit means to be controlled, a first relay for controlling one of said load circuit means, a second relay for controlling the other of said load circuit means, first control circuit means for energizing said first relay, first intermittently operated circuit-interrupting means connected in said first control circuit means, second control circuit means including two parallel branches, one branch for energizing said fist relay independently of said circuit-interrupting means and the other branch for energizing said second relay, and second intermittently operated circuit-interrupting means connected in said other branch.

17. A condition control system comprising in combination, condition changing means operable at two different stages of activity, means responsive to a condition indicative of the need for operation of said condition changing means and effective to produce two different control effects sequentially upon a unidirectional change in said condition in a direction indicative of increased need for operation of said condition changing means, means responsive to the first of said two control effects to cause intermittent operation of said condition changing means at its lower stage, and means responsive to the second of said two control effects to cause said condition changing means to operate alternately at its higher and lower stages.

18. A condition control system comprising in combination, condition changing means operable at two different stages of activity, means responsive to a condition indicative of the need for operation of said condition changing means and effective to produce three different control effects sequentially upon a unidirectional change in said condition in a direction indicative of increased need for operation of said condition changing means, means responsive to the first of said three control effects to cause intermittent operation of said condition changing means at its lower stage, means responsive to the second of said three control effects to cause said condition changing means to operate alternately at its higher and lower stages, and means responsive to the third of said three control effects to cause said condition changing means to operate continuously at its higher stage.

WILLIAM L. McGRATH.